United States Patent
Koike et al.

(10) Patent No.: US 9,963,606 B2
(45) Date of Patent: May 8, 2018

(54) NON-AQUEOUS INK JET INK COMPOSITION AND INK JET RECORDING METHOD

(71) Applicant: Seiko Epson Corporation, Tokyo (JP)

(72) Inventors: Naoki Koike, Matsumoto (JP); Jun Ito, Shimosuwa (JP); Kenichiro Kubota, Matsumoto (JP); Makoto Nagase, Shiojiri (JP)

(73) Assignee: Seiko Epson Corporation (JP)

( * ) Notice: Subject to any disclaimer, the term of this patent is extended or adjusted under 35 U.S.C. 154(b) by 0 days. days.

(21) Appl. No.: 15/045,543

(22) Filed: Feb. 17, 2016

(65) Prior Publication Data

US 2016/0237292 A1 Aug. 18, 2016

(30) Foreign Application Priority Data

Feb. 18, 2015 (JP) ................. 2015-029269

(51) Int. Cl.
*C09D 11/36* (2014.01)
*C09D 11/322* (2014.01)
*C09D 11/106* (2014.01)
*C09D 11/10* (2014.01)

(52) U.S. Cl.
CPC .............. *C09D 11/36* (2013.01); *C09D 11/10* (2013.01); *C09D 11/106* (2013.01); *C09D 11/322* (2013.01)

(58) Field of Classification Search
CPC ......... C09D 11/36; C09D 11/33; B41J 2/2107
See application file for complete search history.

(56) References Cited

U.S. PATENT DOCUMENTS

| | | | | |
|---|---|---|---|---|
| 7,125,447 B2* | 10/2006 | Sugita | ................... | C09D 11/36 106/31.58 |
| 8,511,814 B2* | 8/2013 | Oyanagi | ................ | C09D 11/06 347/100 |
| 8,894,197 B2* | 11/2014 | Oyanagi | .............. | C09D 11/101 347/1 |
| 2008/0182083 A1* | 7/2008 | Oyanagi | .............. | C09D 11/322 428/195.1 |
| 2009/0090271 A1* | 4/2009 | Wynants | ................ | C09D 11/36 106/31.78 |
| 2010/0026743 A1* | 2/2010 | Van Thillo | ................ | B41J 2/175 347/9 |
| 2010/0105807 A1 | 4/2010 | Sugita et al. | | |
| 2012/0212554 A1* | 8/2012 | Koike | ................... | B41M 7/009 347/105 |
| 2013/0029045 A1* | 1/2013 | Koganehira | ......... | C09D 137/00 427/256 |
| 2013/0066006 A1* | 3/2013 | Miyajima | ............ | C09D 11/322 524/497 |
| 2014/0333696 A1* | 11/2014 | Nagase | ................. | C09D 11/36 347/20 |

FOREIGN PATENT DOCUMENTS

JP 2008-248008 A 10/2008

* cited by examiner

*Primary Examiner* — Stephen Meier
*Assistant Examiner* — John P Zimmermann
(74) *Attorney, Agent, or Firm* — Harness, Dickey & Pierce, P.L.C.

(57) ABSTRACT

A non-aqueous ink jet ink composition contains a white pigment having an average particle diameter of 200 nm or more and 400 nm or less, glycol diether represented by the following formula 1 and having a flash point of 70° C. or less, and glycol monoether represented by the following formula 2:

$$R^1O-(R^2O)_m-R^3 \qquad \text{Formula 1:}$$

(In Formula 1, $R^1$ and $R^3$ each independently represent alkyl groups having 1 to 4 carbon atoms, $R^2$ each independently represents alkylene groups having 2 to 3 carbon atoms, and m is an integer of 1 to 4.); and $$HO-(R^4O)_n-R^5 \qquad \text{Formula 2:}$$

(In Formula 2, $R^4$ each independently represents alkylene groups having 2 to 3 carbon atoms, $R^5$ is an alkyl group having 1 to 4 carbon atoms, and n is an integer of 1 to 4.).

17 Claims, No Drawings

NON-AQUEOUS INK JET INK COMPOSITION AND INK JET RECORDING METHOD

BACKGROUND

1. Technical Field

The present invention relates to a non-aqueous ink jet ink composition and an ink jet recording method.

2. Related Art

An ink jet recording method allows recording of high definition images with a relatively simple apparatus, and thus the ink jet recording method has been rapidly developed in various fields. In the development, various examinations have been made for discharge stability and the like. For example, for the purpose of providing an oil-based white ink composition for ink jet recording excellent in long-term storage stability, discharge stability, covering ability to the base of a medium to be printed, and quick-drying properties of printed matter, JP-A-2008-248008 describes an ink composition containing a white pigment, the white pigment which is obtained by further covering titanium oxide fine particles covered with an oxide of aluminum and/or silicon and having an average particle diameter of 0.15 μm or more and 0.25 μm or less with SiH-containing polysiloxane and/or dimethyl polysiloxane so that the content of the SiH-containing polysiloxane and/or dimethyl polysiloxane is 0.01 mass % or more and 0.50 mass % or less, a glycol ether dialkyl ether solvent, a dispersant containing an acrylic copolymer, and an acrylic resin obtained by solution polymerization using a radical polymerization initiator in a glycol ether dialkyl ether solvent or a cyclic ester solvent.

However, the ink composition described in JP-A-2008-248008 has problems that the discharge stability of the ink composition and the covering ability of recorded matter to be obtained have not yet been sufficient.

SUMMARY

An advantage of some aspects of the invention is to provide a non-aqueous ink jet ink composition capable of obtaining recorded matter excellent in discharge stability and covering ability and an ink jet recording method employing the non-aqueous ink jet ink composition.

The present inventors have conducted an intensive research in order to achieve improvements. As a result, the present inventors have found that the advantage can be achieved by the use of an ink composition having a predetermined composition, and thus have accomplished the invention.

More specifically, the invention is as follows.

[1] A non-aqueous ink jet ink composition containing a white pigment having an average particle diameter of 200 nm or more and 400 nm or less, glycol diether represented by the following formula 1 and having a flash point of 70° C. or less, and glycol monoether represented by the following formula 2:

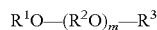  Formula 1:

(In Formula 1, $R^1$ and $R^3$ each independently represent alkyl groups having 1 to 4 carbon atoms, $R^2$ each independently represents alkylene groups having 2 to 3 carbon atoms, and m is an integer of 1 to 4.); and

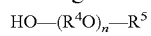  Formula 2:

(In Formula 2, $R^4$ each independently represents alkylene groups having 2 to 3 carbon atoms, $R^5$ is an alkyl group having 1 to 4 carbon atoms, and n is an integer of 1 to 4.).

[2] The non-aqueous ink jet ink composition according to [1] above, in which the content of the glycol diether is 40 to 90 wt %.

[3] The non-aqueous ink jet ink composition according to [1] or [2] above, in which the content of the glycol monoether is 20 wt % or less.

[4] The non-aqueous ink jet ink composition according to any one of [1] to [3] above, in which the content of the white pigment is 5.0 to 20 wt %.

[5] The non-aqueous ink jet ink composition according to any one of [1] to [4] above, in which the ratio of the content of the glycol diether to the content of the glycol monoether (Content of the glycol diether/Content of the glycol monoether) is 2.0 or more and less than 30.

[6] The non-aqueous ink jet ink composition according to any one of [1] to [5] above further containing cyclic lactone.

[7] The non-aqueous ink jet ink composition according to any one of [1] to [6] above further containing vinyl chloride resin.

[8] The non-aqueous ink jet ink composition according to any one of [1] to [7] above, which is caused to adhere to a target recording medium with an adhesion amount of 10 to 30 mg/inch$^2$.

[9] An ink jet recording method including an adhesion process of causing the non-aqueous ink jet ink composition according to any one of [1] to [8] above to adhere to a target recording medium.

DESCRIPTION OF EXEMPLARY EMBODIMENTS

Hereinafter, an embodiment of the invention (hereinafter referred to as "this embodiment") is described in detail but the invention is not limited to this embodiment and can be variously modified without deviating from the scope of the invention.

Non-aqueous Ink Jet Ink Composition

A non-aqueous ink jet ink composition according to this embodiment contains a white pigment having an average particle diameter of 200 nm or more and 400 nm or less, glycol diether represented by the following formula 1 and having a flash point of 70° C. or less, and glycol monoether represented by the following formula 2:

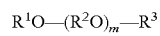  Formula 1:

(In Formula 1, $R^1$ and $R^3$ each independently represent alkyl groups having 1 to 4 carbon atoms, $R^2$ each independently represents alkylene groups having 2 to 3 carbon atoms, and m is an integer of 1 to 4.); and

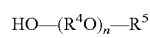  Formula 2:

(In Formula 2, $R^4$ each independently represents alkylene groups having 2 to 3 carbon atoms, $R^5$ is an alkyl group having 1 to 4 carbon atoms, and n is an integer of 1 to 4.).

As ink for use in an ink jet recording system, an aqueous ink containing water as the main solvent and a solvent ink (non-aqueous ink) containing an organic solvent as the main solvent are generally used. In the non-aqueous ink, the content of water in the ink is preferably 5 mass % or less, more preferably 3 mass % or less, and still more preferably 1 mass % or less. The solvent ink is roughly classified into two kinds of ink of a real solvent (high solvent) ink and an eco solvent (low solvent) ink. The eco solvent ink is a solvent ink in which a coloring material is dispersed into an organic solvent having low odor and being environmentally and bodily friendly. The organic solvent for use in the eco solvent ink does not fall under the organic solvents designated by the Industrial Safety and Health Act, does not fall under Type 1 organic solvents and Type 2 organic solvents designated by the Prevention of Organic Solvent Poisoning, or is not obligated to use a local exhaust ventilation at indoor workplaces in the installation environment prescribed by the Fire Service Act.

A white base can be formed by causing a solvent ink containing a white pigment to adhere onto a target recording medium. Thus, the image quality of recorded matter to be obtained by causing a color ink to adhere to the white base further improves. In such a use, it is preferable that the white pigment be uniformly spread (high covering ability) on the target recording medium.

However, such control of the adhesion aspect of the white pigment is not easy. For example, the covering ability further improves when a pigment with a larger average particle diameter is used but the discharge stability tends to decrease. When the drying property of the ink composition is low, the period of time while the pigment can flow in ink droplets adhering onto the target recording medium is prolonged until the ink droplets dry, which accelerates the aggregation of the pigments. Moreover, since the ink droplets contain a plurality of kinds of solvents different in volatility, a solvent having low volatility becomes rich in the drying process. It is considered that this state impairs the pigment dispersion stability and also further accelerates the aggregation of the pigments. Furthermore, when the drying property of the ink composition is excessively high, the solvent dries before the white pigment sufficiently spreads on the target recording medium, so that the covering ability decreases.

Such control of the adhesion aspect of the white pigment relating to the drying property of the ink composition tends to be more difficult in the solvent ink in which various kinds of solvents may be used than in the aqueous ink which can be expected to approximately uniformly dry.

On the other hand, the ink composition of this embodiment can secure discharge stability and can obtain recorded matter excellent in covering ability due to the fact that a pigment having a predetermined average particle diameter, a predetermined glycol diether, and a predetermined glycol monoether in combination. Hereinafter, each component of the ink composition of this embodiment is specifically described.

White Pigment

The white pigment is not particularly limited and, for example, white inorganic pigments, such as C.I. pigment white 6, 18, and 21, titanium oxide, zinc oxide, zinc sulfide, antimony oxide, and zirconium dioxide are mentioned. In addition to the white inorganic pigments mentioned above, white organic pigments, such as hollow white resin particles and polymer particles, can also be used.

The average particle diameter of the white pigment is 200 to 400 nm, preferably 225 to 375 nm, more preferably 250 to 350 nm, and still more preferably 270 to 330 nm. Due to the fact that the average particle diameter of the white pigment is 200 nm or more, the covering ability of the recorded matter to be obtained further improves. Due to the fact that the average particle diameter of the white pigment is 400 nm or less, the discharge stability further improves. The "average particle diameter" is an average particle diameter based on volume unless otherwise particularly specified. As a measuring method, a light intensity distribution pattern of diffraction scattering light is detected using a laser diffraction type particle size distribution meter, and then the light intensity distribution pattern is calculated based on the Mie scattering theory, whereby the particle size distribution based on volume can be determined. The volume average particle diameter can be calculated from the particle size distribution. As such a laser diffraction type particle size distribution meter, Microtrac UPA (manufactured by Nikkiso Co., Ltd.) is mentioned, for example.

The content of the white pigment is preferably 5.0 to 25 wt %, more preferably 10 to 20 wt %, and still more preferably 7.5 to 17.5 wt % based on the total amount of the ink composition. When the content of the white pigment is 5.0 wt % or more, the covering ability of the recorded matter to be obtained tends to further improve. When the content of the white pigment is 25 wt % or less, the discharge stability tends to further improve. The ink composition according to an aspect of the invention is preferably formed into a white ink composition containing the white pigment in the respect that recorded matter excellent in covering ability and the like can be obtained.

Glycol Diether

Glycol diether is represented by the following formula 1. Due to the fact that such glycol diether is contained, the drying property of the ink composition improves, the covering ability of the recorded matter to be obtained further improves, and the occurrence of aggregation unevenness can also be suppressed.

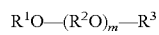

Formula 1:

(In Formula 1, $R^1$ and $R^3$ each independently represent alkyl groups having 1 to 4 carbon atoms, $R^2$ each independently represents alkylene groups having 2 to 3 carbon atoms, and m is an integer of 1 to 4.)

The flash point of glycol diether is 70° C. or less, preferably 30 to 65° C., and more preferably 40 to 60° C. Due to the fact that the flash point of glycol diether is 70° C. or less, the drying property of the ink composition improves, the covering ability of the recorded matter to be obtained further improves, and the occurrence of aggregation unevenness can also be suppressed. When the flash point of glycol diether exceeds 70° C., the drying property deteriorates, aggregation unevenness due to the aggregation of pigments occurs, and the covering ability also decreases. The "flash point" used herein refers to the flash point determined by a Cleveland open cup flash point tester in the case where the flash point determined by a tag closed cup flash point tester is more than 80° C. In the case where the flash point determined by a tag closed cup flash point tester is 80° C. or less, the flash point used herein refers to the flash point determined by a tag closed cup flash point tester when the kinetic viscosity of the solvent at the flash point is less than 10 cSt or refers to the flash point determined by a Seta closed cup flash point tester when the kinetic viscosity of the solvent at the flash point is 10 cSt or more.

Such glycol diether is not particularly limited and, for example, glycol diethylether (35° C.), ethylene glycol dimethyl ether (−6° C.), diethylene glycol methyl ethyl ether (63° C.), diethylene glycol dimethyl ether (56° C.), dipropylene glycol dimethyl ether (56° C.), and propylene glycol dimethyl ether (6.5° C.) are mentioned (The numerals inside the brackets indicate the flash point). The glycol diethers may be used by alone or in combination of two or more kinds thereof.

The content of glycol diether is preferably 35 to wt %, more preferably 40 to 90 wt %, and still more preferably 50 to 80 wt % based on the total amount of the ink composition. Due to the fact that the content of glycol diether is 35 wt % or more, the drying property of the ink composition tends to improve, the covering ability of the recorded matter to be obtained tends to further improve, and also the occurrence of aggregation unevenness tends to be able to be suppressed or further improve. Due to the fact that the content of glycol diether is 90 wt % or less, the drying property of the ink composition decreases and sufficiently spreads, so that the covering ability of the recorded matter tends to further improve.

Glycol Monoether

Glycol monoether is represented by the following formula 2. Due to the fact that such glycol monoether is contained, the drying property can be prevented from becoming excessively high, so that the spreading of ink on a recording medium improves, and thus the covering ability of the recorded matter to be obtained further improves.

$$HO—(R^4O)_n—R^5 \quad \text{Formula 2:}$$

(In Formula 2, $R^4$ each independently represents alkylene groups having 2 to 3 carbon atoms, $R^5$ is an alkyl group having 1 to 4 carbon atoms, and n is an integer of 1 to 4.)

Such glycol monoether is not particularly limited and, for example, ethylene glycol monoisopropyl ether (44° C.), ethylene glycol monoethyl ether (43° C.), ethylene glycol monobutyl ether (60° C.), ethylene glycol monomethyl ether (41° C.), diethylene glycol monoethyl ether (86° C.), diethylene glycol monobutyl ether (78° C.), diethylene glycol monomethyl ether (93° C.), dipropylene glycol monomethyl ether (79° C.), dipropylene glycol monobutyl ether (96° C.), tetraethylene glycol monomethyl ether (161° C.), triethylene glycol monomethyl ether (138° C.), triethylene glycol monoethyl ether (135° C.), triethylene glycol monobutyl ether (143° C.), propylene glycol monoethyl ether (38.5° C.), and propylene glycol monomethyl ether (36° C.) are mentioned (The numerals inside the brackets indicate the flash point). Glycol monoethers may be used by alone or in combination of two or more kinds thereof.

The flash point of glycol monoether is preferably to 140° C., more preferably 80 to 130° C., and still more preferably 90 to 120° C. Due to the fact that the flash point of glycol monoether is within the ranges mentioned above, the covering ability of the recorded matter to be obtained tends to further improve and also aggregation unevenness tends to be suppressed.

A difference between the flash point of glycol diether and the flash point of glycol monoether (Flash point of glycol monoether—Flash point of glycol diether) is preferably 10 to 100° C., more preferably 20 to 90° C., and still more preferably 30 to 80° C. Due to the fact that the difference between the flash point of glycol diether and the flash point of glycol monoether is within the ranges mentioned above, the covering ability of the recorded matter to be obtained tends to further improve and also the aggregation unevenness tends to be suppressed. When a plurality of kinds of glycol diethers and glycol monoethers are contained in ink, the difference between the flash points is a value obtained by weight averaging the flash point of each of the plurality of kinds of glycol diethers and glycol monoethers by the content thereof based on the ink for each glycol diether and glycol monoether.

The content of glycol monoether is preferably 40 wt % or less, more preferably 20 wt % or less, still more preferably 1.0 to 25 wt %, yet still more preferably 1.0 to 12.5 wt %, particularly preferably 3.0 to 10 wt %, and further particularly preferably 3.0 to 7.5 wt % based on the total amount of the ink composition. Due to the fact that the content of glycol monoether is 1.0 wt % or more, the covering ability of the recorded matter to be obtained of the ink tends to further improve. Due to the fact that the content of glycol monoether is 40 wt % or less, the aggregation unevenness of the recorded matter to be obtained tends to be further suppressed.

The ratio A of the content of glycol diether to the content of glycol monoether (Content of glycol diether/Content of glycol monoether) is preferably 2.0 or more and less than 30, more preferably 5.0 to 25, and still more preferably 10 to 20. Due to the fact that the ratio A is within the ranges mentioned above, the covering ability of the recorded matter to be obtained tends to further improve and also the aggregation unevenness tends to be suppressed.

Cyclic Lactone

The ink composition may further contain cyclic lactone. Due to the fact that cyclic lactone is contained, the abrasion resistance of the recorded matter to be obtained tends to further improve. The cyclic lactone is not particularly limited, and compounds having a cyclic structure with an ester bond and γ-lactone of a 5-membered ring structure, δ-lactone of a 6-membered ring structure, ε-lactone of a 7-membered ring structure, and the like are mentioned, for example. More specifically, γ-butyrolactone, γ-valerolactone, γ-hexalactone, γ-heptalactone, γ-octalactone, γ-nonalactone, γ-decalactone, γ-undecalactone, δ-valerolactone, δ-hexalactone, δ-heptalactone, δ-octalactone, δ-nonalactone, δ-decalactone, δ-undecalactone, and ε-caprolactam are mentioned. Among the above, γ-butyrolactone and δ-valerolactone are more preferable.

The content of cyclic lactone is preferably 0.10 to 5.0 wt %, more preferably 0.50 to 3.5 wt %, and still more preferably 1.0 to 2.5 wt % based on the total amount of the ink composition. Due to the fact that the content of cyclic lactone is 0.10 wt % or more, the abrasion resistance tends to further improve. Due to the fact that the content of cyclic lactone is 5.0 wt % or less, the permeation of the ink into the recording medium tends to be suppressed and the covering ability tends to further improve.

Fixing Resin

The ink composition may further contain a fixing resin. Due to the fact that the fixing resin is contained, the abrasion resistance tends to further improve. The fixing resin is not particularly limited and, for example, vinyl chloride resin, fiber resin, such as cellulose acetate butyrate, acrylic resin, styrene acrylic resin, rosin modified resin, phenol resin, terpene resin, polyester resin, polyamide resin, epoxy resin, vinyltoluene-α-methylstyrene copolymer resin, and the like are mentioned. Among the above, the vinyl chloride resin is preferable. By the use of such a fixing resin, the fixability to a film recording medium tends to further improve and the fixability particularly to a vinyl chloride film recording medium tends to further improve.

The vinyl chloride resin is not particularly limited and vinyl chloride copolymers, such as a vinyl chloride polymer and vinyl chloride acetate resin, and the like are mentioned, for example.

The content of the fixing resin is preferably 0.10 to 10 wt %, more preferably 0.50 to 7.5 wt %, and still more preferably 1.0 to 5.0 wt % based on the total amount of the ink composition. Due to the fact that the content of the fixing resin is 0.10 wt % or more, the abrasion resistance tends to further improve. Due to the fact that the content of the fixing resin is 10 wt % or less, the discharge stability tends to further improve.

Surfactant

The ink composition may further contain a surfactant. The surfactant is not particularly limited and, for example, polyoxy alkylene alkyl ether, acetylene glycol surfactants, fluorine based surfactants, and silicone surfactants are mentioned. Among the above, from the viewpoint of improving the spreadability of ink and the slipperiness of the surface of recorded matter and achieving more excellent abrasion resistance, polyoxy alkylene alkyl ether is preferable.

The polyoxyalkylene alkyl ether is not particularly limited to the substances mentioned below and, for example, the compounds represented by the following formula (3) are mentioned.

$$R^6O(C_2H_4O)_w(C_3H_6O)_x(C_2H_4O)_y(C_3H_6O)_zH \quad (3)$$

(In Formula (3), $R^6$ represents an alkyl group having 1 to 20 carbon atoms, preferably represents an alkyl group having 5 to 15 carbon atoms, and more preferably represents an alkyl group having 10 to 15 carbon atoms. w is a value of 1 to 20, x, y, and z independently represent values of 0 or 1 to 20. w, x, y, and z satisfy 5≤w+x+y+z≤30 and preferably satisfy 5≤w+x+y+z≤25.)

The polyoxyalkylene alkyl ether is not particularly limited and specific examples include
$C_{12}H_{25}O(C_2H_4O)_6(C_3H_6O)_2(C_2H_4O)_6(C_3H_6O)_8H$,
$C_{13}H_{27}O(C_2H_4O)_6(C_3H_6O)_2(C_2H_4O)_6(C_3H_6O)_8H$,
$C_{12}H_{25}O(C_2H_4O)_w(C_3H_6O)_x(C_2H_4O)_y(C_3H_6O)_zH$ (herein w+y=15,x+z=4),
$C_{13}H_{27}O(C_2H_4O)_w(C_3H_6O)_x(C_2H_4O)_y(C_3H_6O)_zH$ (herein, w+y=15,x+z=4),
$C_{12}H_{25}O(C_2H_4O)_8(C_3H_6O)_2(C_2H_4O)_6H$,
$C_{13}H_{27}O(C_2H_4O)_8(C_3H_6O)_2(C_2H_4O)_6H$,
$C_{12}H_{25}O(C_2H_4O)_{12}(C_3H_8O)_2(C_2H_4O)_{12}H$,
$C_{13}H_{27}O(C_2H_4O)_{12}(C_3H_6O)_2(C_2H_4O)_{12}H$,
$CH_3(CH_2)_9(CH_3)CHO(C_2H_4O)_7(C_3H_6O)_{4.5}H$,
$CH_3(CH_2)_{11}(CH_3)CHO(C_2H_4O)_7(C_3H_6O)_{4.5}H$,
$CH_3(CH_2)_9(CH_3)CHO(C_2H_4O)_5(C_3H_6O)_{3.5}H$,
$CH_3(CH_2)_{11}(CH_3)CHO(C_2H_4O)_5(C_3H_6O)_{3.5}H$,
$C_{14}H_{29}O(C_2H_4O)_{14}(C_3H_6O)_2H$,
$C_{11}H_{23}O(C_2H_4O)_8H$,
$C_{10}H_{21}O(C_2H_4O)_{11}H$, and
$C_{12}H_{25}O(C_2H_4O)_{15}H$.

Commercially-available items of polyoxyalkylene alkyl ether are not particularly limited and specific examples include
NOIGEN DL-0415 ($R^6O(C_2H_4O)_w(C_3H_6O)_x(C_2H_4O)_y(C_3H_6O)_zH$, "$R^6$": Alkyl having 12 to 13 carbon atoms, w+y=15, x+z=4, HLB value of 15.0,
NOIGEN ET-116B ($R^6O(C_2H_4O)_2(C_3H_6O)_{4.5}H$. "$R^6$": Alkyl having 12 to 14 carbon atoms, HLB value of 12.0,
NOIGEN ET-106A($R^6O(C_2H_4O)_5(C_3H_6O)_{3.5}H$, "$R^6$": Alkyl having 12 to 14 carbon atoms, HLB value of 10.9,
NOIGEN DH-0300 ($R^6O(C_2H_4O)_2H$), "$R^6$": Alkyl having 14 carbon atoms, HLB value of 4.0,
NOIGEN YX-400 ($R^6O(C_2H_4O)_{40}H$), "$R^6$": Alkyl having 12 carbon atoms, HLB value of 18.1, and
NOIGEN EA-160 ($C_9H_{19}C_6H_4O(C_2H_4O)_{16.8}H$, HLB value of 15.4 (all manufactured by Daiichi Kogyo Seiyaku Co., Ltd.), and
EMULGEN 1108 (Trade name, manufactured by Kao-Corporation, $R^6O(C_2H_4O)_8H$, "R": Alkyl having 11 carbon atoms, HLB value of 13.4).

The polyoxyalkylene alkyl ethers may be used alone or in combination of two or more kinds thereof.

The acetylene glycol surfactants are not particularly limited and, for example, preferably one or more kinds selected from 2,4,7,9-tetramethyl-5-decyne-4,7-diol and alkylene oxide adducts of 2,4,7,9-tetramethyl-5-decyne-4,7-diol and 2,4-dimethyl-5-decyne-4-ol and alkylene oxide adducts of 2,4-dimethyl-5-decyne-4-ol. Commercially-available items of the acetylene glycol surfactant are not particularly limited and examples thereof include, for example, Olfine 104 series and E series, such as Olfine E1010 (Trade name, manufactured by Air Products Japan, Inc.), Surfynol 465 and Surfynol 61 (Trade name, manufactured by Nissin Chemical Industry Co., Ltd.), and the like. The acetylene glycol surfactants may be used alone or in combination of two or more kinds thereof.

The fluorine based surfactants are not particularly limited and examples thereof include, for example, perfluoroalkylsulfonate, perfluoroalkylcarboxylate, perfluoroalkylphosphate, a perfluoroalkyl ethylene oxide adduct, perfluoroalkyl betaine, and a perfluoroalkyl amine oxide compound. Commercially-available item of the fluorine based surfactant are not particularly limited and examples thereof include, for example, S-144 and S-145 (manufactured by Asahi Glass Co., Ltd.); FC-170C, FC-430, and Fluorad FC4430 (manufactured by Sumitomo 3M, Inc.); FSO, FSO-100, FSN, FSN-100, and FS-300 (manufactured by Dupont); FT-250 and 251 (manufactured by Neos Co., Ltd.), and the like. The fluorine based surfactants may be used alone or in combination of two or more kinds thereof.

Examples of the silicone surfactants include a polysiloxane compound, a polyether modified organosiloxane, and the like. Commercially-available items of the silicone surfactant are not particularly limited and specific examples thereof include BYK-306, BYK-307, BYK-333, BYK-341, BYK-345, BYK-346, BYK-347, BYK-348, and BYK-349 (Trade name, all manufactured by BYK Chemie Japan, Inc.), KF-96-2cs, KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (Trade name, all manufactured by Shin-Etsu Chemical Co., Ltd.), and the like.

The content of the surfactant is preferably 0.10 to 7.5 wt %, more preferably 0.50 to 5.0 wt %, and still more preferably 1.0 to 3.0 wt % based on the total amount of the ink composition.

Dispersant

The ink composition may further contain a dispersant which disperses a pigment. The dispersant is not particularly limited and anionic dispersants, nonionic dispersants, and polymer dispersants are mentioned, for example.

The anionic dispersants are not particularly limited and examples thereof include, for example, a formalin condensate of aromatic sulphonic acid, a formalin condensate of β-naphthalene sulfonate, a formalin condensate of alkyl naphthalene sulfonate, and a formalin condensate of creosote oil sulfonate.

The aromatic sulphonic acid is not particularly limited and examples thereof include, for example, alkyl naphthalene sulfonates, such as creosote oil sulfonic acid, cresol sulfonic acid, phenolsulfonic acid, β-naphtholsulfonic acid, methylnaphthalene sulfonic acid, and butyl naphthalene sulfonic acid, a mixture of β-naphthalene sulfonic acid and β-naphtholsulfonic acid, a mixture of cresol sulfonic acid and 2-naphthol-6-sulfonic acid, lignin sulfonic acid, and the like.

The nonionic dispersants are not particularly limited and an ethylene oxide adduct of phytosterol, an ethylene oxide adduct of cholestanol, and the like are mentioned, for example.

The polymer dispersants are not particularly limited and polyacrylic acid partial alkyl ester, polyalkylene polyamine, polyacrylic acid salt, a styrene-acrylic acid copolymer, a vinyl naphthalene-maleic acid copolymer, and the like are mentioned, for example.

Other Components

In order to maintain good storage stability and good discharge stability from a head of the ink composition, improve clogging, or prevent degradation of the ink composition, various additives, such as a dissolution assistant, a viscosity modifier, a pH adjuster, an antioxidant, an antiseptic, an antifungal agent, a corrosion prevention agent, and a chelating agent for capturing metal ions affecting dispersion may be added to the ink composition as appropriate.

Ink Jet Recording Method

An ink jet recording method of this embodiment has an adhesion process of causing the non-aqueous ink jet ink composition to adhere to a target recording medium.

Adhesion Process

The adhesion process is a process of causing the ink composition to adhere to a target recording medium using an ink jet method. The discharge of the ink composition by an ink jet system can be performed using a known ink jet recording apparatus. As a discharging method, a piezoelectric system, a system of discharging ink by bubbles generated in heated ink, and the like can be used.

The adhesion amount of the non-aqueous ink jet ink composition to the target recording medium is preferably 1 to 35 mg/inch$^2$, more preferably 10 to 30 mg/inch$^2$, and still more preferably 15 to 25 mg/inch$^2$. When the adhesion amount is within the ranges mentioned above, the recorded matter to be obtained has excellent covering ability and aggregation unevenness is suppressed, and thus the adhesion amount is preferable. In the case of the ink composition according to an aspect of the invention, even when the adhesion amount is not within the ranges mentioned above, the drying property tends to be excellent, the covering ability of the recorded matter to be obtained tends to be excellent, and aggregation unevenness tends to be suppressed. An adhesion process in which the adhesion amount is at least within the ranges of the adhesion amount mentioned above in the adhesion process may be included. Preferably, as the maximum adhesion amount in the adhesion process, the ranges mentioned above are mentioned.

Target Recording Medium

The target recording medium which can be used in this embodiment is not particularly limited and an absorbing target recording medium, a low-ink-absorbing target recording medium, and a non-ink-absorbing target recording medium are mentioned, for example.

The absorbing target recording medium is not particularly limited and examples thereof include, for example, plain paper, such as an electrophotographic paper having high permeability of an ink composition, an ink jet paper (an exclusive paper for ink jet printing which has an ink absorbing layer containing silica particles or alumina particles or an ink absorbing layer containing a hydrophilic polymer, such as polyvinyl alcohol (PVA) or polyvinyl pyrrolidone (PVP)), a target recording medium having a support containing paper, and the like.

The low-ink-absorbing recording medium or the non-ink-absorbing target recording medium refers to a target recording medium having a property of not absorbing an ink composition at all or hardly absorbing an ink composition, respectively. Quantitatively, the non-ink absorbing or low-ink absorbing recording medium refers to a "recording medium in which the water absorption amount from the initiation of contact to 30 msec$^{1/2}$ is 10 mL/m$^2$ or lower in the Bristow method". This Bristow method is the most popular method as a method for measuring the liquid absorption amount in a short time and is employed also in the Japan Technical Association of the Pulp and Paper Industry (JAPAN TAPPI). The details of a test method are described in "Liquid Absorbency Test Method of Paper and Paperboard (Bristow Method)" of Standard No. 51 of "JAPAN TAPPI paper pulp test method, 2000". On the other hand, the ink-absorbing target recording medium refers to a target recording medium which does not fall under the non-ink-absorbing recording medium and the low-ink-absorbing recording medium.

Examples of the non-ink-absorbing target recording medium include a plastic film not having an ink absorbing layer, a base material such as paper that is plastic-coated or has a plastic film being attached thereto, and the like. Examples of the plastic used herein include polyvinyl chloride, polyethylene terephthalate, polycarbonate, polystyrene, polyurethane, polyethylene, polypropylene, and the like.

As the ink low-ink-absorbing target recording medium, a target recording medium having a coating layer for receiving ink on the surface is mentioned, for example. As those having paper as the base material, printing paper, such as art paper, coated paper, and mat paper, are mentioned. When the base material is a plastic film, those in which the surface of the plastic film made of polyvinyl chloride, polyethylene terephthalate, polycarbonate, polystyrene, polyurethane, polyethylene, polypropylene, or the like is coated with a hydrophilic polymer, and those in which the surface of the plastic film is coated with particles of silica, titanium, or the like with a binder, and the like are mentioned.

Furthermore, besides the target recording media mentioned above, non-ink-absorbing or low-ink-absorbing target recording media, such as plates of metals, such as iron, silver, copper, and aluminum, and glass, can also be used.

EXAMPLES

Hereinafter, the invention is more specifically described with reference to Examples and Comparative Examples. The invention is not particularly limited at all by the following Examples.

Materials for Ink Composition

Main materials for ink composition used in the following Examples and Comparative Examples are as follows.

[Pigment]
Titania (TiO$_2$) Particle diameter: 155 nm
Titania (TiO$_2$) Particle diameter: 209 nm
Titania (TiO$_2$) Particle diameter: 315 nm
Titania (TiO$_2$) Particle diameter: 385 nm
Titania (TiO$_2$) Particle diameter: 445 nm
[Cyclic lactone]
γ-butyro lactone
ε-valero lactone
[Glycol Diether]
DEGMEE (Diethylene glycol methyl ethyl ether, Flash point of 63° C.)
DEGdME (Diethylene glycol dimethyl ether, Flash point of 56° C.)
DEGdEE (Diethylene glycol diethylether, Flash point of 71° C.)
DEGBME (Diethylene glycol butyl methyl ether, Flash point of 94° C.)
TriEGdME (Triethylene glycol dimethyl ether, Flash point of 113° C.)
[Glycol Monoether]
DPGmBE (Dipropylene glycol monobutyl ether)
TriEGmBE (Triethylene glycol monobutyl ether)

[Dispersant]
BYK2050
[Surfactant]
NOIGEN LP-70 (Daiichi Kogyo Seiyaku Co., Ltd., Polyoxyalkylene ether)
[Fixing Resin]
SOLBIN CL (manufactured by Nissin Chemical Industry Co., Ltd., Vinyl chloride vinyl acetate based modified resin) Preparation of ink composition The materials were mixed with the composition shown in the following table 1, and then sufficiently stirred to give each ink composition. Specifically, each ink was prepared by uniformly mixing the materials, and then removing undissolved substances through a filter. In the following table 1, the unit of the values is mass % and the total is 100.0 mass %.

TABLE 1

|  |  | Examples |  |  |  |  |  |  |  |  |
|---|---|---|---|---|---|---|---|---|---|---|
|  |  | 1 | 2 | 3 | 4 | 5 | 6 | 7 | 8 | 9 |
| Pigment | Titania (TiO$_2$) Particle diameter: 155 nm |  |  |  |  |  |  |  |  |  |
|  | Titania (TiO$_2$) Particle diameter: 209 nm |  | 15 |  |  |  |  |  |  |  |
|  | Titania (TiO$_2$) Particle diameter: 315 nm | 15 |  |  | 15 | 15 | 15 | 15 | 5 | 20 |
|  | Titania (TiO$_2$) Particle diameter: 385 nm |  |  | 15 |  |  |  |  |  |  |
|  | Titania (TiO2) Particle diameter: 445 nm |  |  |  |  |  |  |  |  |  |
| Cyclic lactone | γ-butyro lactone | 2 | 2 | 2 | 2 | 2 | 2 | 2 | 2 | 2 |
|  | ε-valero lactone |  |  |  |  |  |  |  |  |  |
| Glycol diether | DEGMEE (Flash point of 64° C.) | 69.5 | 69.5 | 69.5 |  | 35 | 69.5 | 49.5 | 79.5 | 64.5 |
|  | DEGdME (Flash point of 56° C.) |  |  |  | 69.5 |  |  |  |  |  |
|  | DEGdEE (Flash point of 71° C.) |  |  |  |  |  |  |  |  |  |
|  | DEGBME (Flash point of 94° C.) |  |  |  |  |  |  |  |  |  |
|  | TriEGdME (Flash point of 113° C.) |  |  |  |  |  |  |  |  |  |
| Glycol monoether | DPGmBE | 5 | 5 | 5 | 5 | 39.5 |  | 25 | 5 | 5 |
|  | TriEGmBE |  |  |  |  |  | 5 |  |  |  |
| Dispersant | BYK2050 | 4 | 4 | 4 | 4 | 4 | 4 | 4 | 4 | 4 |
| Surfactant | NOIGEN LP-70 (Daiichi Kogyo Seiyaku Co., Ltd.) | 1.5 | 1.5 | 1.5 | 1.5 | 1.5 | 1.5 | 1.5 | 1.5 | 1.5 |
| Fixing resin | SOLBIN CL | 3 | 3 | 3 | 3 | 3 | 3 | 3 | 3 | 3 |
| Total |  | 100 | 100 | 100 | 100 | 100 | 100 | 100 | 100 | 100 |
| Glycol diether content/Glycol monoether content |  | 13.90 | 13.90 | 13.90 | 13.90 | 0.89 | 13.90 | 1.98 | 15.90 | 12.90 |
| Evaluation | Discharge stability | ○ | ○ | △ | ○ | ○ | ○ | ○ | ○ | △ |
|  | Image quality (Covering ability) | ○ | △ | ○ | ○ | △ | ○ | ○ | △ | ○ |
|  | Aggregation unevenness | ○ | ○ | ○ | ○ | △ | ○ | △ | ○ | ○ |
|  | Abrasion resistance | ○ | ○ | ○ | ○ | ○ | ○ | ○ | ○ | △ |

|  |  | Examples |  | Comparative Examples |  |  |  |  |  |
|---|---|---|---|---|---|---|---|---|---|
|  |  | 10 | 11 | 1 | 2 | 3 | 4 | 5 | 6 |
| Pigment | Titania (TiO$_2$) Particle diameter: 155 nm |  |  | 15 |  |  |  |  |  |
|  | Titania (TiO$_2$) Particle diameter: 209 nm |  |  |  |  |  |  |  |  |
|  | Titania (TiO$_2$) Particle diameter: 315 nm | 15 | 15 |  |  | 15 | 15 | 15 | 15 |
|  | Titania (TiO$_2$) Particle diameter: 385 nm |  |  |  |  |  |  |  |  |
|  | Titania (TiO2) Particle diameter: 445 nm |  |  |  | 15 |  |  |  |  |
| Cyclic lactone | γ-butyro lactone |  | 2 | 2 | 2 | 2 | 2 | 2 | 2 |
|  | ε-valero lactone | 2 |  |  |  |  |  |  |  |
| Glycol diether | DEGMEE (Flash point of 64° C.) | 69.5 | 71.5 | 69.5 | 69.5 |  |  |  | 74.5 |
|  | DEGdME (Flash point of 56° C.) |  |  |  |  |  |  |  |  |
|  | DEGdEE (Flash point of 71° C.) |  |  |  |  | 69.5 |  |  |  |
|  | DEGBME (Flash point of 94° C.) |  |  |  |  |  | 69.5 |  |  |
|  | TriEGdME (Flash point of 113° C.) |  |  |  |  |  |  | 69.5 |  |
| Glycol monoether | DPGmBE | 5 | 5 | 5 | 5 | 5 | 5 | 5 |  |
|  | TriEGmBE |  |  |  |  |  |  |  |  |
| Dispersant | BYK2050 | 4 | 4 | 4 | 4 | 4 | 4 | 4 | 4 |
| Surfactant | NOIGEN LP-70 (Daiichi Kogyo Seiyaku Co., Ltd.) | 1.5 | 1.5 | 1.5 | 1.5 | 1.5 | 1.5 | 1.5 | 1.5 |
| Fixing resin | SOLBIN CL | 3 | 3 | 3 | 3 | 3 | 3 | 3 | 3 |
| Total |  | 100 | 100 | 100 | 100 | 100 | 100 | 100 | 100 |
| Glycol diether content/Glycol monoether content |  | 13.90 | 14.30 | 13.90 | 13.90 | 13.90 | 13.90 | 13.90 |  |
| Evaluation | Discharge stability | ○ | ○ | ○ | X | ○ | ○ | ○ | ○ |
|  | Image quality (Covering ability) | ○ | ○ | X | ○ | X | X | X | X |
|  | Aggregation unevenness | ○ | ○ | ○ | ○ | ○ | △ | X | ○ |
|  | Abrasion resistance | ○ | △ | ○ | △ | ○ | ○ | ○ | ○ |

Method for Producing Recorded Matter

Each ink composition of Examples and Comparative Examples was evaluated in printing tests using an ink jet printer (manufactured by Seiko Epson Corp., Type "SC-S70650"). Each ink composition was adhered to a transparent PET medium (manufactured by Lintec Corporation, Type E-1000ZC) with a recording resolution of 720×1440 dpi in such a manner as to have an adhesion amount of 18 mg/inch$^2$, and then dried at 25° C. and −65% RH (relative humidity) for one day to produce a sample of recorded matter.

Discharge Stability

In a state where the number of vibrations of a piezoelectric element mounted in an ink jet printer (manufactured by Seiko Epson Corp., Type "SC-570650") was set to 5 kHz and the driving waveform was optimized, continuous discharge of liquid droplets for 300 seconds from each nozzle of a head was performed, and then the discharge of the liquid droplets was interrupted for 300 seconds (one sequence) for each ink composition. Then, the operation of the continuous discharge of liquid droplets and the interruption of the discharge was similarly repeatedly performed by 10 sequences. At the time of the completion of sequences, the printing stability evaluation (intermittent evaluation) was performed by counting the number of non-discharging nozzles among 360 nozzles. The evaluation results are shown in Table 1. The evaluation criteria are as follows.

Evaluation Criteria

◯: Number of non-discharging nozzles is 0.

Δ: Number of non-discharging nozzles is 1 to 4.

X: Number of non-discharging nozzles is 5 or more.

Image Quality (Covering Ability)

The obtained recorded matter was evaluated for covering ability. Specifically, each sample was set in a multi-angle colorimeter ARM-500V (manufactured by JASCO Corporation), and then the transmittance Tn (%) of light rays in the visible light region (380 to 800 nm) was measured at a resolution of 1 nm at a scanning speed of 2000 nm/min. The covering ability S was determined by integrating the obtained transmittance over the visible light region. The covering ability S is a value in the range of 0 to 32000. When light is completely blocked, the covering ability S is 0 and, when light is completely transmitted, the covering ability S is 32000. The evaluation results are shown in Table 1. The evaluation criteria are as follows.

Evaluation Criteria

◯: The covering ability is less than 500.

Δ: The covering ability is 500 or more and less than 1000.

X: The covering ability is 1000 or more.

Aggregation Unevenness

The aggregation unevenness was evaluated by visually observing aggregation unevenness of the pigment on the recorded surface of the obtained recorded matter. The evaluation results are shown in Table 1. The evaluation criteria are as follows.

Evaluation Criteria

◯: Aggregation unevenness is not observed even under magnified observation.

Δ: Aggregation unevenness is observed under magnified observation.

X: Aggregation unevenness is observed.

Abrasion Resistance

The obtained recorded matter was evaluated for abrasion resistance using color fastness rubbing tester (manufactured by TESTER SANGYO CO., LTD., trade name "AB-301") according to JIS K5701 (ISO 11628). More specifically, cotton cloth was placed on the recorded surface of the recorded matter, the surface was rubbed by moving the cotton cloth 20 times under a load of 500 g, and then the peeled state of the recorded surface of the recorded matter after rubbing was visually observed. The evaluation results are shown in Table 1. The evaluation criteria are as follows.

Evaluation Criteria

◯: The cotton cloth is not stained. The recorded surface is not damaged.

Δ: Adhesion of the recorded matter is observed on the cotton cloth. The recorded surface is hardly damaged.

X: Adhesion of the recorded matter is observed on the cotton cloth. The recorded surface is damaged.

As described above, in Examples, recorded matter excellent in discharge stability and excellent in covering ability was able to be obtained. On the other hand, in Comparative Example 1 in which the average particle diameter of the pigment was small, the covering ability of the recorded matter to be obtained was low. In Comparative Example 2 in which the average particle diameter of the pigment was large, the discharge stability was poor. It was found that, even in the case of one in which the average particle diameter of the pigment is 300 nm, when the flash point of glycol diether was high, the drying property was poor and the covering ability decreased. It was also found that, when the flash point of glycol diether was higher, the drying property was poor and aggregation unevenness was likely to occur. It was further found that, when glycol monoether was not contained, the drying property was excessively high and the covering ability decreased.

The entire disclosure of Japanese Patent Application No. 2015-029269, filed Feb. 18, 2015 is expressly incorporated by reference herein.

What is claimed is:

1. A non-aqueous ink jet ink composition comprising:
a white pigment having an average particle diameter of 200 nm or more and 400 nm or less;
an organic solvent as a main solvent;
water in an amount of 5 mass % or less;
a cyclic lactone in an amount that ranges between 0.1 to 5.0 wt %;
glycol diether represented by Formula 1 shown below and having a flash point of 70° C. or less; and
glycol monoether represented by Formula 2 shown below:

$$R^1O-(R^2O)_m-R^3 \qquad \text{Formula 1:}$$

wherein, in Formula 1, $R^1$ and $R^3$ each independently represent alkyl groups having 1 to 4 carbon atoms, $R^2$ each independently represents alkylene groups having 2 to 3 carbon atoms, and m is an integer of 1 to 4; and $$HO-(R^4O)_n-R^5 \qquad \text{Formula 2:}$$

wherein, in Formula 2, $R^4$ each independently represents alkylene groups having 2 to 3 carbon atoms, $R^5$ is an alkyl group having 1 to 4 carbon atoms, and n is an integer of 1 to 4, and
wherein the glycol monoether is one of ethylene glycol monoisopropyl ether, ethylene glycol monoethyl ether, ethylene glycol monobutyl ether, ethylene glycol monomethyl ether, diethylene glycol monoethyl ether, diethylene glycol monobutyl ether, dipropylene glycol monomethyl ether, tetraethylene glycol monomethyl ether, triethylene glycol monoethyl ether, triethylene glycol monobutyl ether, propylene glycol monoethyl ether, and propylene glycol monomethyl ether.

2. The non-aqueous ink jet ink composition according to claim 1, wherein a content of the glycol diether is 40 to 90 wt %.

3. The non-aqueous ink jet ink composition according to claim 1, wherein a content of the glycol monoether is 20 wt % or less.

4. The non-aqueous ink jet ink composition according to claim 1, wherein a content of the white pigment is 5.0 to 20 wt %.

5. The non-aqueous ink jet ink composition according to claim 1, wherein a ratio of the content of the glycol diether to the content of the glycol monoether (Content of the glycol diether/Content of the glycol monoether) is 2.0 or more and less than 30.

6. The non-aqueous ink jet ink composition according to claim 1, further comprising vinyl chloride resin.

7. The non-aqueous ink jet ink composition according to claim 1, wherein the non-aqueous ink jet ink composition is caused to adhere to a target recording medium with an adhesion amount of 10 to 30 mg/inch$^2$.

8. An ink jet recording method comprising:
causing the non-aqueous ink jet ink composition according to claim 1 to adhere to a target recording medium.

9. A non-aqueous ink jet ink composition comprising:
a white pigment having an average particle diameter of 270 nm or more and 400 nm or less;
an organic solvent as a main solvent;
water in an amount of 5 mass % or less;
a cyclic lactone in an amount that ranges between 0.1 to 5.0 wt %;
glycol diether represented by Formula 1 shown below and having a flash point of 70° C. or less; and
glycol monoether represented by Formula 2 shown below:

$$R^1O\text{—}(R^2O)_m\text{—}R^3 \qquad \text{Formula 1:}$$

wherein, in Formula 1, $R^1$ and $R^3$ each independently represent alkyl groups having 1 to 4 carbon atoms, $R^2$ each independently represents alkylene groups having 2 to 3 carbon atoms, and m is an integer of 1 to 4; and $$HO\text{—}(R^4O)_n\text{—}R^5 \qquad \text{Formula 2:}$$

wherein, in Formula 2, $R^4$ each independently represents alkylene groups having 2 to 3 carbon atoms, $R^5$ is an alkyl group having 1 to 4 carbon atoms, and n is an integer of 1 to 4.

10. The non-aqueous ink jet ink composition according to claim 9, wherein a content of the glycol diether is 40 to 90 wt %.

11. The non-aqueous ink jet ink composition according to claim 9, wherein a content of the glycol monoether is 20 wt % or less.

12. The non-aqueous ink jet ink composition according to claim 9, wherein a content of the white pigment is 5.0 to 20 wt %.

13. The non-aqueous ink jet ink composition according to claim 9, wherein a ratio of the content of the glycol diether to the content of the glycol monoether (Content of the glycol diether/Content of the glycol monoether) is 2.0 or more and less than 30.

14. The non-aqueous ink jet ink composition according to claim 9, further comprising vinyl chloride resin.

15. The non-aqueous ink jet ink composition according to claim 9, wherein the non-aqueous ink jet ink composition is caused to adhere to a target recording medium with an adhesion amount of 10 to 30 mg/inch$^2$.

16. An ink jet recording method comprising:
causing the non-aqueous ink jet ink composition according to claim 9 to adhere to a target recording medium.

17. The non-aqueous ink jet ink composition according to claim 1, wherein a content of the glycol monoether is 1.0 to 25 wt %.

* * * * *